(12) United States Patent
Zhao et al.

(10) Patent No.: US 12,430,012 B2
(45) Date of Patent: Sep. 30, 2025

(54) PLAYING VIDEOS AND DISPLAYING A POSTING IDENTIFIER DURING A VIDEO POSTING PROCESS

(71) Applicant: Beijing Zitiao Network Technology Co., Ltd., Beijing (CN)

(72) Inventors: Liyan Zhao, Beijing (CN); Yajie Yu, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 0 days.

(21) Appl. No.: 18/746,625

(22) Filed: Jun. 18, 2024

(65) Prior Publication Data

US 2024/0338112 A1    Oct. 10, 2024

Related U.S. Application Data

(63) Continuation of application No. PCT/CN2022/138295, filed on Dec. 12, 2022.

(30) Foreign Application Priority Data

Dec. 23, 2021   (CN) .......................... 202111592580.4

(51) Int. Cl.
| | |
|---|---|
| *G06F 3/0484* | (2022.01) |
| *G06F 3/0483* | (2013.01) |
| *H04N 21/2743* | (2011.01) |
| *H04N 21/431* | (2011.01) |

(52) U.S. Cl.
CPC .......... *G06F 3/0484* (2013.01); *G06F 3/0483* (2013.01); *H04N 21/2743* (2013.01); *H04N 21/4316* (2013.01); *G06F 2203/04806* (2013.01)

(58) Field of Classification Search
None
See application file for complete search history.

(56) References Cited

U.S. PATENT DOCUMENTS

| | | | | |
|---|---|---|---|---|
| 8,615,450 | B1 * | 12/2013 | Fanelli | G06Q 30/0633 |
| | | | | 705/28 |
| 8,750,682 | B1 | 6/2014 | Nicksay et al. | |
| 8,959,453 | B1 * | 2/2015 | Harnish | H04N 21/47217 |
| | | | | 715/788 |
| 10,917,455 | B2 | 2/2021 | Qu et al. | |
| 11,039,074 | B1 * | 6/2021 | Manzari | G06F 3/0488 |
| 2008/0072261 | A1 * | 3/2008 | Ralston | G11B 27/034 |
| | | | | 725/62 |

(Continued)

FOREIGN PATENT DOCUMENTS

| | | |
|---|---|---|
| CN | 107291356 A | 10/2017 |
| CN | 108037860 A | 5/2018 |

(Continued)

OTHER PUBLICATIONS

International Patent Application No. PCT/CN2022/138295; Int'l Search Report; dated Mar. 10, 2023; 3 pages.

(Continued)

*Primary Examiner* — Gabriel Mercado
(74) *Attorney, Agent, or Firm* — BakerHostetler

(57) ABSTRACT

A video posting method, an apparatus, an electronic device, a storage medium, and a program product are provided. The video posting method includes: receiving a posting operation for a target video; and in response to the posting operation, playing the target video, and displaying a posting identifier of the target video in a first display style. The posting identifier is used for indicating posting progress of the target video.

19 Claims, 10 Drawing Sheets

(56) References Cited

U.S. PATENT DOCUMENTS

| | | | |
|---|---|---|---|
| 2012/0278728 A1* | 11/2012 | Malin | H04N 21/44209 |
| | | | 709/217 |
| 2014/0032718 A1 | 1/2014 | Berger et al. | |
| 2014/0289367 A1* | 9/2014 | Kinebuchi | H04L 67/02 |
| | | | 709/219 |
| 2017/0031905 A1* | 2/2017 | Boyer | G06F 16/78 |
| 2017/0131839 A1* | 5/2017 | Zhang | G06F 3/04883 |
| 2020/0169596 A1 | 5/2020 | Qu et al. | |
| 2020/0349315 A1* | 11/2020 | Wang | G06F 40/106 |
| 2020/0364668 A1* | 11/2020 | Altunkaynak | G06F 3/0481 |
| 2021/0027251 A1* | 1/2021 | Sankar | G06Q 10/063112 |
| 2022/0197748 A1* | 6/2022 | Behera | G06F 11/1443 |
| 2024/0119969 A1* | 4/2024 | He | G06F 3/04842 |
| 2024/0193886 A1* | 6/2024 | Sadalgi | G06T 19/20 |

FOREIGN PATENT DOCUMENTS

| | | |
|---|---|---|
| CN | 110909204 A | 3/2020 |
| CN | 111510762 A | 8/2020 |
| CN | 111625313 A | 9/2020 |
| CN | 111770385 A | 10/2020 |
| CN | 111857919 A | 10/2020 |
| CN | 112925463 A | 6/2021 |
| CN | 113204298 A | 8/2021 |
| CN | 113411490 A | 9/2021 |
| CN | 113542902 A | 10/2021 |
| CN | 113727168 A | 11/2021 |
| CN | 113783997 A | 12/2021 |
| CN | 114302208 A | 4/2022 |
| WO | WO 2021/196903 A1 | 10/2021 |
| WO | WO 2021/238636 A1 | 12/2021 |

OTHER PUBLICATIONS

China Patent Application No. 202111592580.4; Office Action; dated Jun. 9, 2023; 21 pages.
European Patent Application No. 22909794.4; Extended Search Report; dated Jan. 30, 2025; 8 pages.
Japan Patent Application No. 2024-535681; Notice of Reasons for Refusal; dated Jul. 1, 2025; 8 pages.

* cited by examiner

PLAYING VIDEOS AND DISPLAYING A POSTING IDENTIFIER DURING A VIDEO POSTING PROCESS

CROSS-REFERENCE TO RELATED APPLICATION

This application is a continuation of International Patent Application No. PCT/CN2022/138295, filed on Dec. 12, 2022, which claims the priority to and benefits of Chinese patent application No. 202111592580.4, filed on Dec. 23, 2021. All the aforementioned patent applications are hereby incorporated by reference in their entireties.

TECHNICAL FIELD

The present disclosure relates to a field of computer technology, for example, relates to a video posting method, an apparatus, an electronic device, a storage medium, and a program product.

BACKGROUND

After clicking a video posting button, the user may switch to a video play page and browse other videos having been posted while waiting for finishing the video posting.

However, in the above-described video posting mode, the video posting and viewing process takes a long time, thus resulting in poor user experience.

SUMMARY

The present disclosure provides a video posting method, an apparatus, an electronic device, a storage medium, and a program product, to shorten time consumed for the video posting and viewing process.

In the first aspect, the present disclosure provides a video posting method, which comprises:
receiving a posting operation for a target video; and
in response to the posting operation, playing the target video, and displaying a posting identifier of the target video in a first display style, wherein the posting identifier is used for indicating posting progress of the target video.

In the second aspect, the present disclosure further provides a video posting apparatus, which comprises:
a posting operation receiving module, configured to receive a posting operation for a target video; and
a video playing module, configured to: in response to the posting operation, play the target video, and display a posting identifier of the target video in a first display style, wherein the posting identifier is used for indicating posting progress of the target video.

In the third aspect, the present disclosure further provides an electronic device, which comprises:
at least one processor; and
a memory, configured to store at least one program,
wherein the at least one program, when executed by the at least one processor, causes the at least one processor to implement the video posting method according to any one of claims 1 to 8.

In the fourth aspect, the present disclosure further provides a computer-readable storage medium. A computer program is stored on the computer-readable storage medium. The program, when executed by a processor, implements the video posting method described above.

In the fifth aspect, the present disclosure further provides a computer program product. The computer program product, when executed by a computer, causes the computer to implement the video posting method described above.

DETAILED DESCRIPTION

The following describes the embodiments of the present disclosure referring to the accompanying drawings. Although some embodiments of the present disclosure are illustrated in the accompanying drawings, the present disclosure can be implemented in various forms, and these embodiments are provided for the purpose of understanding the present disclosure. The accompanying drawings and the embodiments of the present disclosure are for illustrative purposes only.

The multiple steps recorded in the method implementation of the present disclosure may be executed in different orders and/or in parallel. In addition, the method implementation may include additional steps and/or omit operating the illustrated steps. The scope of the present disclosure is not limited in this regard.

The terms "including", "comprising" and their variations used in the disclosure mean including in open way, that is, "including but not limited to". The term "based on" means "at least partially based on". The term "one embodiment" means "at least one embodiment". The term "another embodiment" means "at least one other embodiment". The term "some embodiments" means "at least some embodiments". The relevant definitions of other terms will be provided in the following description.

The concepts such as "first", "second", etc. mentioned in the present disclosure are only used to distinguish different devices, modules or units, and are not intended to limit the order or interdependence of the functions performed by these devices, modules or units.

The modifications of "one", "a", and "multiple" mentioned in the present disclosure are illustrative rather than restrictive, and those skilled in the art should understand that unless otherwise specified in the context, they should be understood as "one or more".

Names of messages or information exchanged between a plurality of apparatuses according to implementations of the present disclosure are for illustrative purposes only and are not intended to limit the scope of the messages or information.

Figure 1:
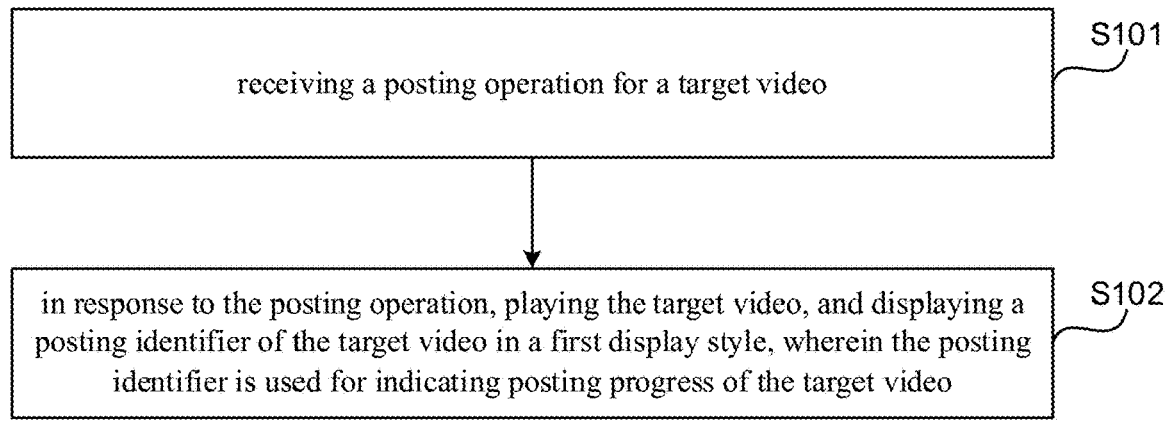
FIG. 1 is a schematic flow chart of a video posting method provided by an embodiment of the present disclosure.

FIG. 1 is a schematic flow chart of a video posting method provided by an embodiment of the present disclosure. The method can be executed by a video posting apparatus. The apparatus may be implemented by software and/or hardware, and may be configured in an electronic device, for example, may be configured in a mobile phone or a tablet personal computer. The video posting method provided by the embodiments of the present disclosure is applicable to a video posting scenario. As illustrated in FIG. 1, the video posting method provided by this embodiment may include following operations.

S101: receiving a posting operation for a target video.

The target video may be a video that a user currently wants to post. The posting operation may be an operation of posting a video, for example, an operation of triggering a posting control of the target video.

When the user wants to post a video, for example, when the user finishes capturing and/or editing a video and wants to post the same, the user may instruct the electronic device to display the posting control of the target video and trigger the posting control. Correspondingly, when detecting a user triggering the posting control of a video, the electronic device may take this video as the target video and confirm receipt of the posting operation for the target video.

S102: in response to the posting operation, playing the target video, and displaying a posting identifier of the target video in a first display style, wherein the posting identifier is used for indicating posting progress of the target video.

In this embodiment, during the posting process of the video, the video posted by the user is automatically played. So, after executing the posting operation, the user may preview the video posted and view whether exhibition styles of the added title, introduction information, etc. in this video meet expectation or whether the video information is blocked, etc. through previewing, without waiting for viewing only after finishing video posting, which allows the user to discover problems in the video timely, reduces waiting time of the user, and improving user experience.

The posting identifier may be an identifier used for indicating the posting progress of the target video, for example, an identifier used for indicating that the target video is currently being posted but has not yet been completed, for example, a posting icon, an "In posting . . . " identifier, a "posting . . . " identifier, and/or a posting progress value of the target video; or, an identifier used for indicating that the target video has been posted, for example, a "posting succeeded" identifier used for indicating that the target video is posted successfully, or a "posting failed" identifier used for indicating that the target video posting has failed, etc., which may be determined according to the posting progress of the target video. For example, when the target video has not yet been posted, the posting identifier may be an identifier used for indicating that the target video is being posted but has not yet been completed; and when the target video has been posted, the posting identifier may be an identifier used for indicating that the target video has been posted.

Figure 2:
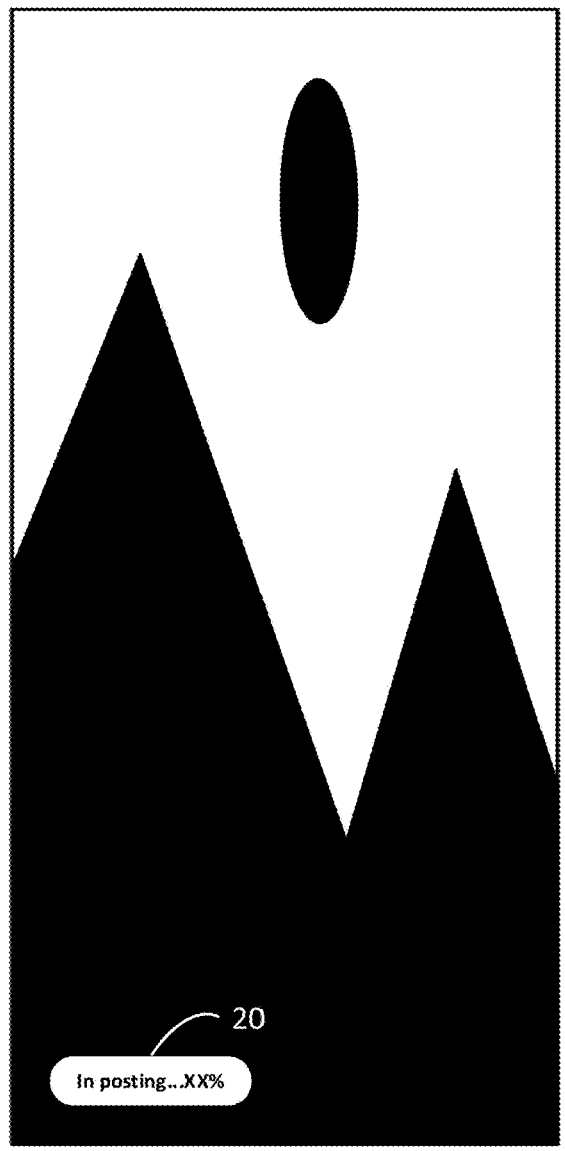
FIG. 2 is a schematic diagram of a posting identifier provided by an embodiment of the present disclosure.

When receiving the posting operation for the target video, the electronic device may, in response to the posting operation, post the target video, for example, upload the target video to the server for posting; and, while posting the target video, switch to the video play page, play the target video on the video play page, and display the posting identifier 20 of the target video in a first display style, as illustrated in FIG. 2. When the target video has not yet been posted, in the first display style, the posting identifier 20 of the target video may include a posting icon for indicating that the target video is being posted and/or a copy for indicating that the target video is being posted (e.g., "In posting . . . " and/or a posting progress value of the target video, etc.).

Here, the video play page may be a friend page used for playing videos posted by a friend of the current user, a follow page used for playing videos posted by other users followed by the current user, and/or a recommendation page used for playing recommended videos, etc., which will not be limited in this embodiment. Considering that a video creator may have a video viewing demand different from that of an ordinary user, when the current user has a large number of fans (e.g., greater than a certain fan count threshold), the current user may be considered as a video creator, and the target video may be played on the recommendation page of the current user; when the current user has a small number of fans (e.g., less than or equal to a certain fan count threshold), the current user may be considered as an ordinary user, and the target video may be played on the friend page of the current user.

In this embodiment, the page used for playing the target video is not limited. For example, in this embodiment, the target video may also be directly played on the posting page of the target video with the posting identifier of the target video displayed.

In the video posting method provided by the embodiments, the posting operation for the target video is received; in response to the posting operation, the target video is played and the posting identifier of the target video is displayed in a first display style. The posting identifier is used for indicating the posting progress of the target video. In this embodiment, by adopting the above-described technical solution, the video is played during the video posting process, so that the user can preview the video being posted during the video posting process without waiting for finishing video posting, which allows the user to discover problems in the video timely, reduces waiting time for the user, and improves user experience.

Figure 3:
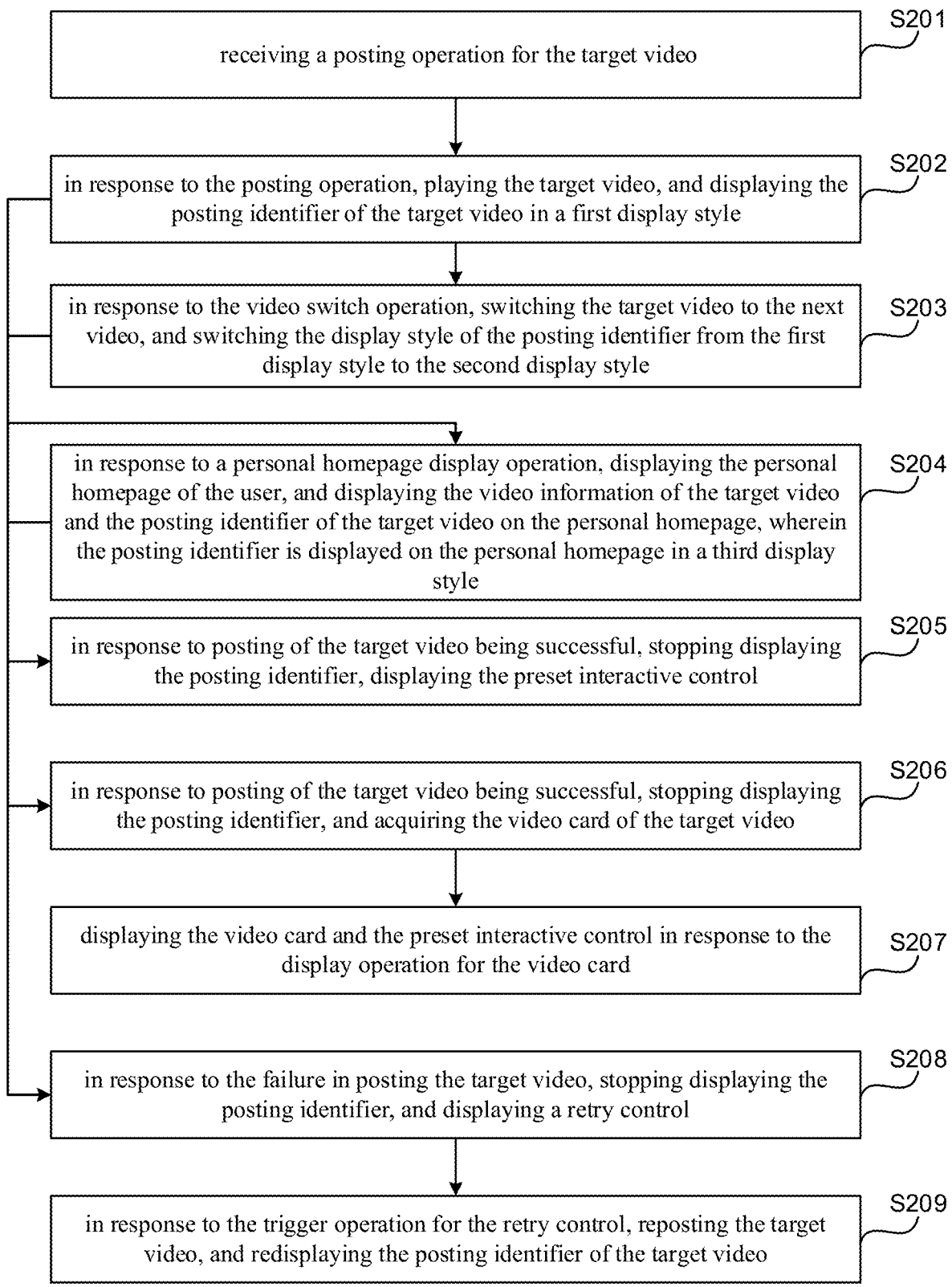
FIG. 3 is a schematic flow chart of another video posting method provided by an embodiment of the present disclosure.

FIG. 3 is a schematic flow chart of another video posting method provided by an embodiment of the present disclosure. The solution according to this embodiment may be combined with one or more solutions according to the above-described embodiments. After displaying the posting identifier of the target video in the first display style, the method further includes: in response to a video switch operation, switching the target video to a next video, and switching the display style of the posting identifier from the first display style to a second display style.

After displaying the posting identifier of the target video in the first display style, the method further includes: in response to a personal homepage display operation, displaying a personal homepage of the user, and displaying video information of the target video and the posting identifier of the target video on the personal homepage. The posting identifier is displayed in a third display style on the personal homepage.

The video posting method provided by this embodiment further includes: in response to posting of the target video being successful, stopping displaying the posting identifier, and displaying a preset interactive control.

The video posting method provided by this embodiment further includes: in response to posting of the target video being successful, stopping displaying the posting identifier, and acquiring the video card of the target video; and displaying the video card and the preset interactive control in response to the display operation for the video card.

The video posting method provided by this embodiment further includes: in response to failure in posting the target video, stopping displaying the posting identifier, and displaying a retry control; and in response to a trigger operation of the retry control, reposting the target video, and redisplaying the posting identifier of the target video.

Correspondingly, as illustrated in FIG. 3, the video posting method provided by this embodiment may include following operations.

S201: receiving a posting operation for the target video.

S202: in response to the posting operation, playing the target video, and displaying the posting identifier of the target video in a first display style; and executing S203, S204, S205, S206 or S208, wherein the posting identifier is used for indicating the posting progress of the target video.

S203: in response to the video switch operation, switching the target video to the next video, and switching the display style of the posting identifier from the first display style to the second display style, and executing S204, S205, S206 or S208.

The video switch operation may be an operation of switching the currently played video, for example, a vertical sliding operation. The currently played video may be a video being played on the current page, for example, the target video.

When receiving the posting operation for the target video, the electronic device may switch the current page from the posting page of the target video to the video play page, acquire a video stream of the video play page from a server, add the target video to the video stream (e.g., add to the top of the video stream, etc.), obtain a target video stream, play the target video in the target video stream, and display the posting identifier 20 of the target video in the first display style, as illustrated in FIG. 2. Therefore, the user may execute the video switch operation when the user wants to switch the currently played target video. Correspondingly, when receiving the video switch operation of the user, the electronic device may switch the currently played video from the target video to the next video based on the video switch operation, for example, switch to a video adjacent to the target video in the target video stream, and switch the display style of the posting identifier 20 of the target video from the first display style to the second display style, as illustrated in FIG. 4.

Figure 4:
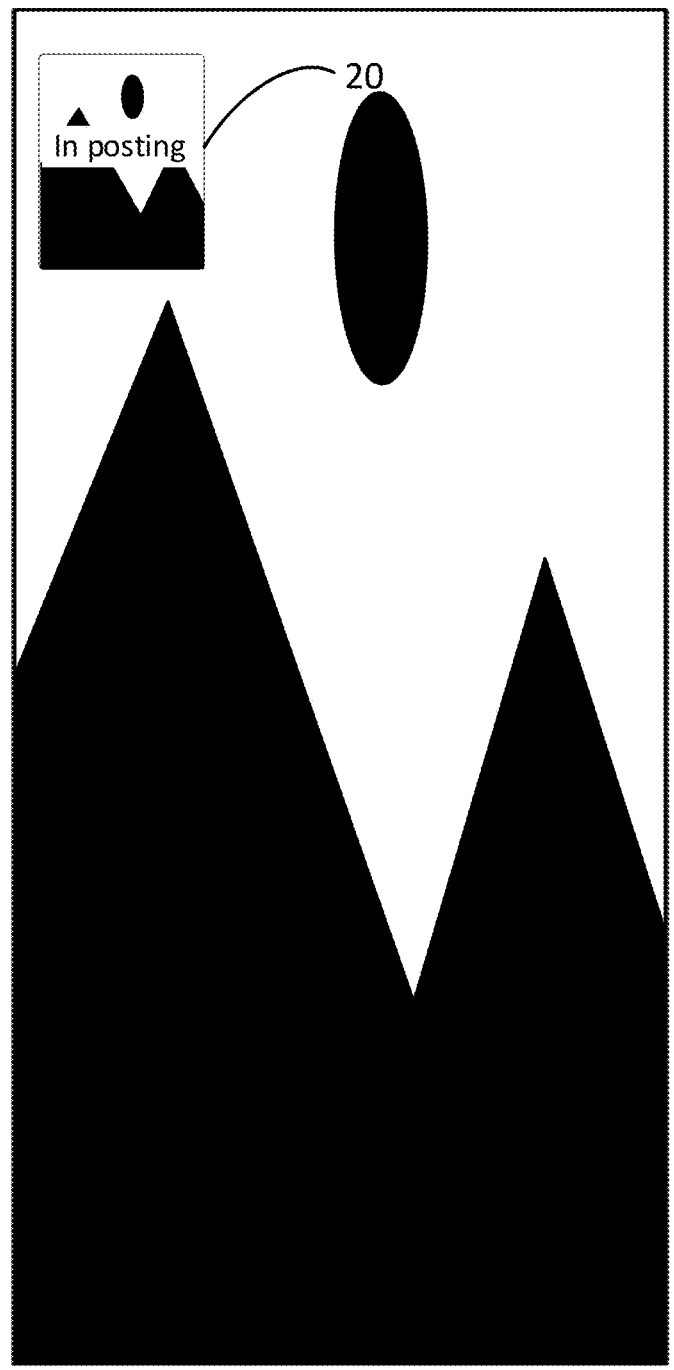
FIG. 4 is a schematic diagram of another posting identifier provided by an embodiment of the present disclosure.

In this embodiment, when the currently played video is just the target video, that is, when the target video is being currently played, the posting identifier 20 of the target video may only include a posting icon and/or a posting copy, as illustrated in FIG. 2; when the currently played video is a video other than the target video, the posting identifier 20 of the target video may be displayed in a form of floating window, and in this case, in addition to displaying the posting icon and/or the posting copy, the posting identifier 20 of the target video may further include video information of the target video (e.g., a video cover of the target video), for example, the posting icon and/or the posting copy may be displayed in an upper layer of the video cover of the target video, as illustrated in FIG. 4, so that the user knows that this posting identifier is the posting identifier 20 of the target video.

When the user does not want to continue viewing the video in the target video stream, the user may also refresh the video stream on the video play page through a video stream refresh operation. At this time, when receiving the video stream refresh operation of the user, the electronic device may acquire a new video stream from the server for the video play page and no longer add the target video into the new video stream, to avoid repeated automatic play of the target video and to improve user experience.

S204: in response to a personal homepage display operation, displaying the personal homepage of the user, and displaying the video information of the target video and the posting identifier of the target video on the personal homepage, and executing S205, S206 or S208, wherein the posting identifier is displayed in the third display style on the personal homepage.

The personal homepage display operation may be an operation used for instruct the electronic device to display the user's own personal homepage, for example, an operation of triggering a personal homepage control displayed on the page. The video information of the target video may include information such as the video cover of the target video, etc.

For example, when displaying the video play page, the user may perform a page switch operation, for example, switch the current page to another page and may switch from the other page to enter the use's own personal homepage, or, switch the current page to the user's own personal homepage.

Figure 5:
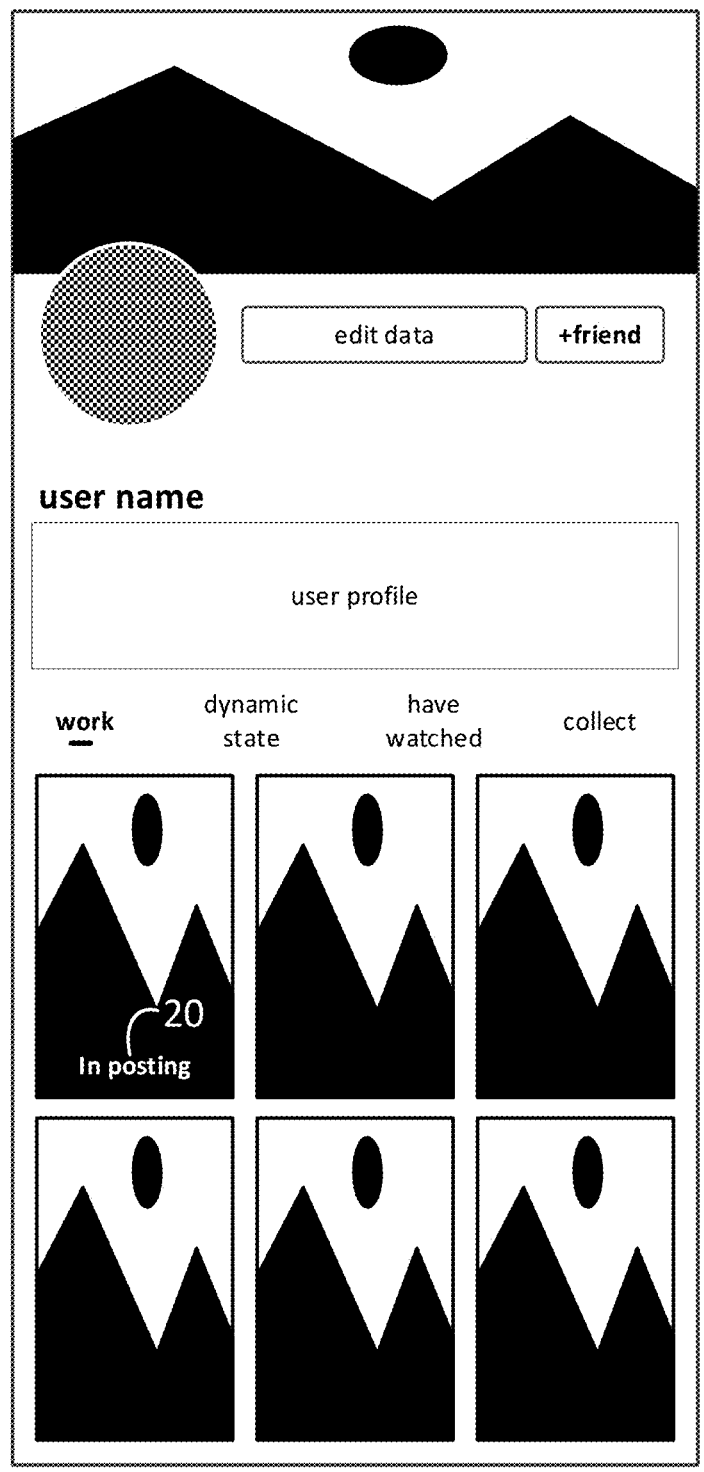
FIG. 5 is a schematic diagram of a personal homepage provided by an embodiment of the present disclosure.

Correspondingly, as illustrated in FIG. 5, when detecting a trigger operation of a user switching to enter the user's own personal homepage, that is, when receiving the personal homepage display operation, the electronic device may display the personal homepage of the user, display the video information of the target video on the personal homepage, and display the posting identifier in the third display style in the display region where the video information is located. For example, the work information of each successfully posted work by the user is displayed in the user's work list, as well as the video information of the target video that is currently posted by the user but has not yet successfully posted and the posting identifier 20 of the target video are displayed in the user's work list, so as to indicate the posting progress of the corresponding video through the posting identifier 20. When a plurality of works in the work list are arranged in an order of posting time from late to early, the video information of the target video being posted may be displayed before the work information of the works having been successfully posted. When the target video has not yet been posted, in the third display style, the posting identifier 20 of the target video may include a posting icon for indicating that the target video is being posted and/or a copy for indicating that the target video is being posted (e.g., "In posting . . . " and/or a posting progress value of the target video, etc.).

Therefore, the user may instruct the electronic device to switch the current page from the personal homepage to the video play page of the target video by triggering the video information of the target video displayed on the personal homepage, and play the video being posted on the video play page to preview this video.

In this embodiment, the video posted by the user can be exhibited as the work of the user on the personal homepage of the user during the video posting process, so that the user can view the video information of the video being posted or preview the video being posted in the use's own personal homepage without waiting for finishing video posting, which can reduce waiting time of the user and improve user experience.

S205: in response to posting of the target video being successful, stopping displaying the posting identifier, displaying the preset interactive control, and ending the operation.

In this embodiment, when the target video posting has succeeded, the preset interactive control of the target video may be displayed on the current page, so that the user may trigger the preset interactive control to perform a corresponding interactive operation, thereby providing convenience for user interaction.

The preset interactive control may be set according to needs, for example, the preset interactive control may include a capturing control and/or a sharing control; and hereinafter, it is illustrated by taking that the preset interactive control includes the capturing control and the sharing control as an example.

Figure 6:
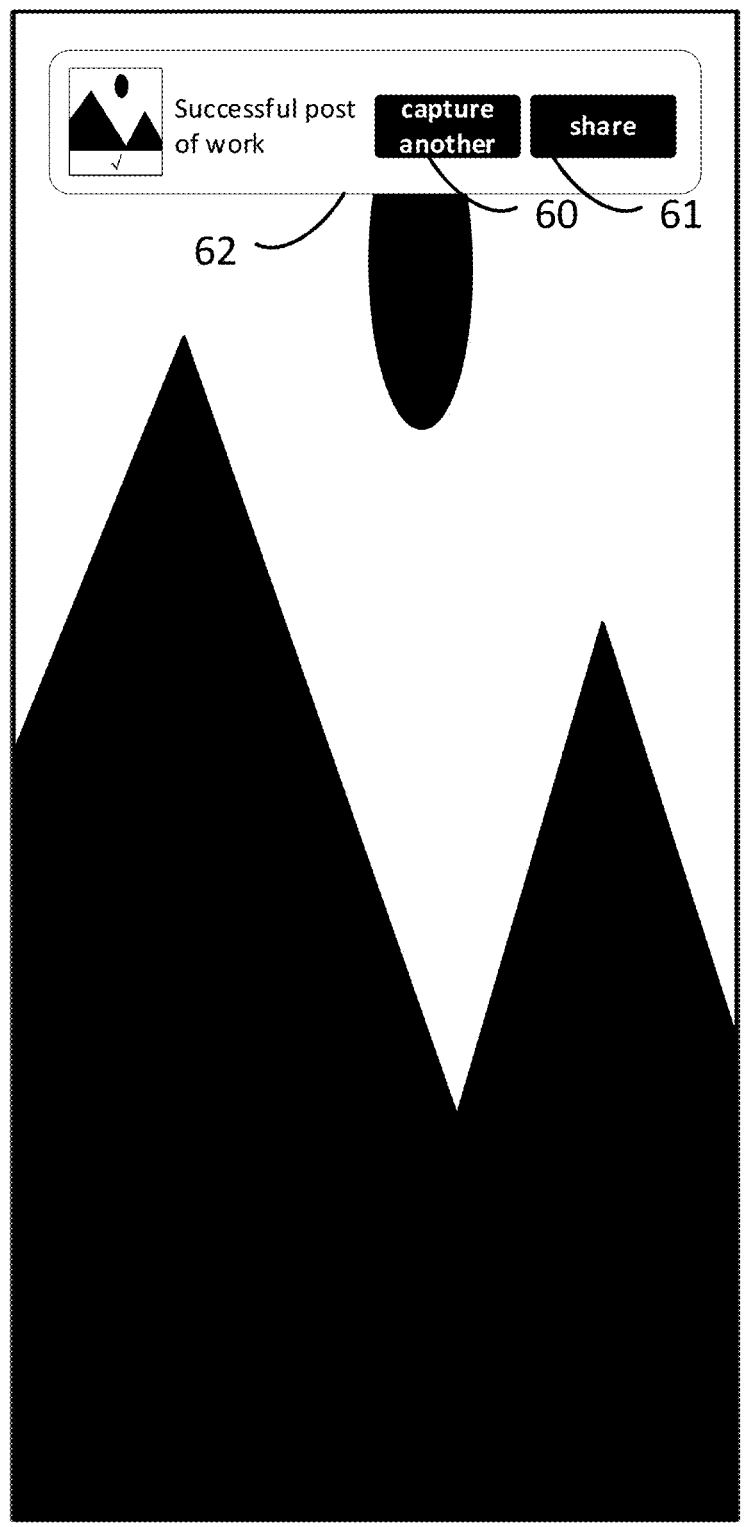
FIG. 6 is a schematic diagram of a "posting succeeded" prompt window provided by an embodiment of the present disclosure.

When the target video posting has succeeded, the electronic device may stop displaying the posting identifier of the target video and display the capturing control 60 and the sharing control 61, for example, may display the capturing control 60 and the sharing control 61 on the current page (e.g., the video play page or the personal homepage); or may also pop up a posting success prompt window 62 and display the capturing control 60 and the sharing control 61 in the posting success prompt window 62, and may also display a posting success prompt message in the posting success prompt window 62, as illustrated in FIG. 6, to prompt the user that the target video has been successfully posted. Therefore, when the user wants to capture a new video for posting, the user may trigger the capturing control 60; when the user wants to share the target video, the user may trigger the sharing control 61. Correspondingly, when detecting a user triggering the capturing control 60, the electronic device may switch the current page to a capturing page for the user to capture a new video for posting; when detecting a user triggering the sharing control 61, the electronic device may display a sharing panel of the target video for the user to share the target video.

In an implementation, displaying the preset interactive control includes: zooming out a video play region of the current page and displaying the preset interactive control outside the video play region that is zoomed out.

In the above-described implementations, the preset interactive control may also be displayed by zooming out the video play region.

Figure 7:
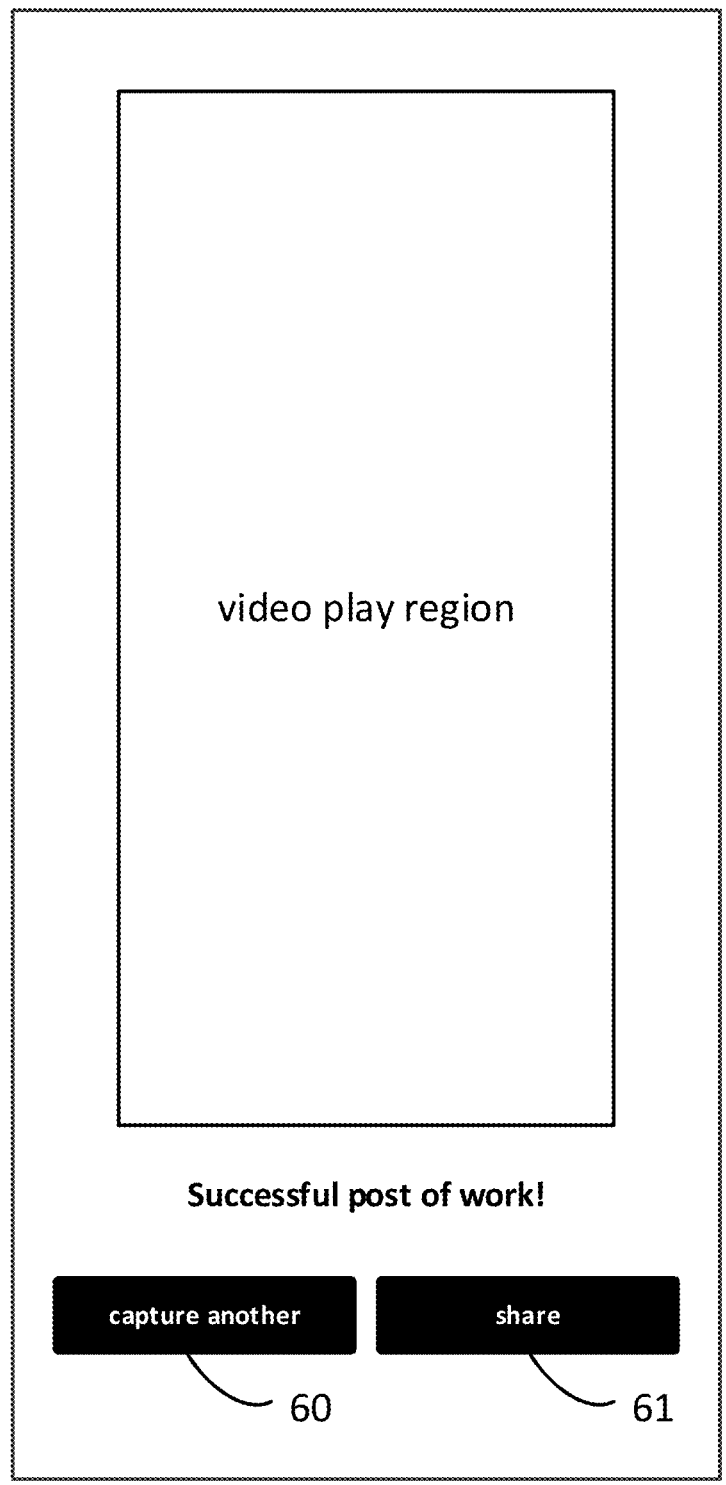
FIG. 7 is a schematic diagram of a video play region provided by an embodiment of the present disclosure.

As illustrated in FIG. 7, when the target video posting has succeeded, a size of the video play region may be zoomed out. During and after the zoom-out process, the currently played video may be kept playing in the video play region; after the zoom-out process is completed, the capturing control 60 and/or the sharing control 61 of the target video may be displayed outside the video play region (e.g., below video play region). Therefore, when the user wants to capture a new video for posting, the user may trigger the capturing control 60; when the user wants to share the target video, the user may trigger the sharing control 61. Correspondingly, when detecting a user triggering the capturing control 60, the electronic device may switch the current page to the capturing page for the user to capture a new video for posting; when detecting a user triggering the sharing control 61, the electronic device may display the sharing panel of the target video for the user to share the target video.

In addition, when sharing is completed or upon receiving a trigger operation of closing the sharing panel, the electronic device may stop displaying the sharing panel of the target video, and zoom in the video play region to an original size thereof before it is zoomed out.

S206: in response to posting of the target video being successful, stopping displaying the posting identifier, and acquiring the video card of the target video.

S207: displaying the video card and the preset interactive control in response to the display operation for the video card.

In this embodiment, the electronic device may not directly display the preset interactive control, but instead display the preset interactive control of the target video upon receiving the trigger operation of displaying the video card of the target video, so as to prevent display of the capturing control during the user viewing the currently played video from interrupting the user viewing the currently played video, and improve user experience.

The display operation for the video card of the target video may be an operation of instructing the electronic device to display the video card of the target video, for example, the video switch operation, etc.

When the target video is posted successfully, the electronic device may stop displaying the posting identifier of the target video, and generate the video card of the target video or acquire the video card of the target video from the server; so, when the user wants to view the video card of the target video, wants to capture a video, or wants to share the target video, the user may execute a view operation for the video card of the target video; and correspondingly, when detecting the view operation of the user, the electronic device may display the preset card of the target video and the preset interactive control.

Figure 8:
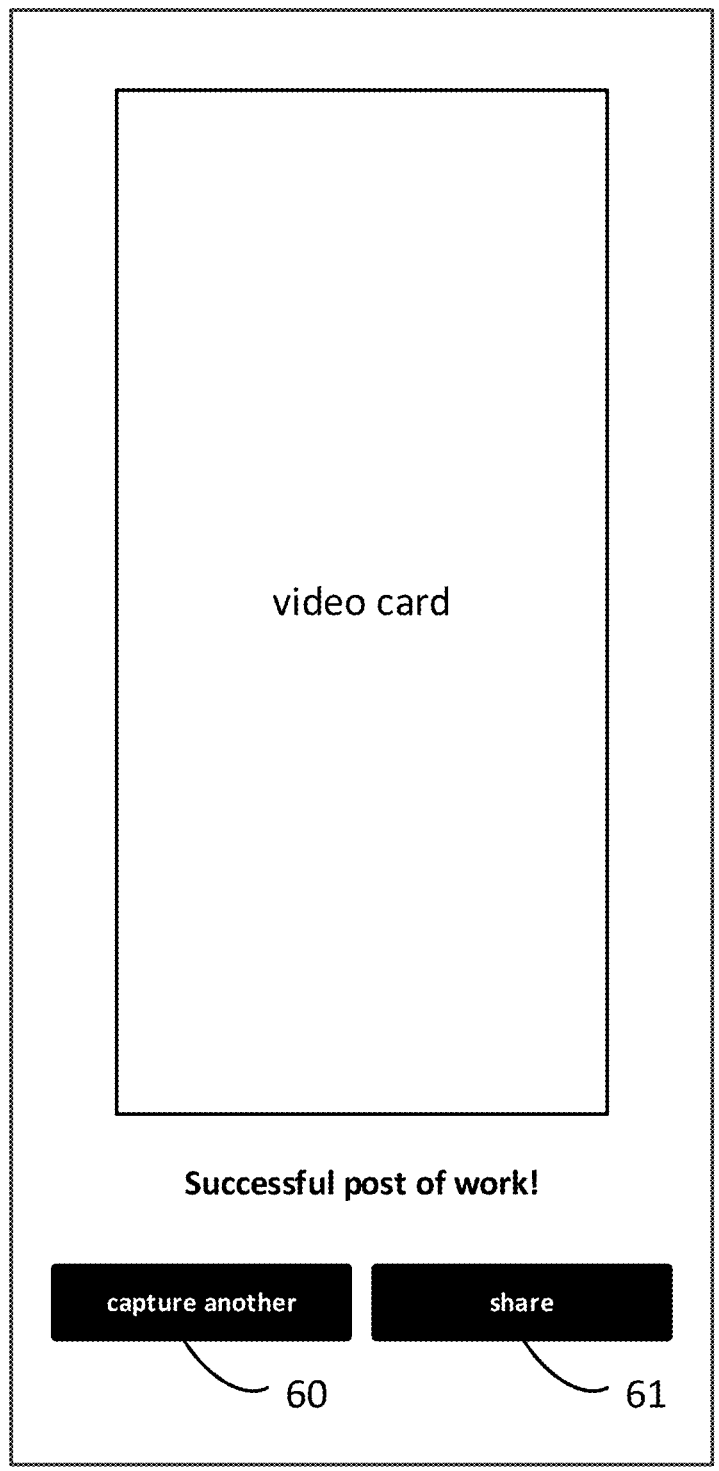
FIG. 8 is a schematic diagram of a video card provided by an embodiment of the present disclosure.

Taking that the view operation is the video switch operation as an example, when acquiring the video card of the target video, the electronic device may add the video card between the currently played video and an adjacent video thereof in the current video stream, for example, add the video card of the target video between the currently played video and a previous video and/or a next video thereof; so, when receiving a video switch operation of switching to the previous video and/or the next video from the user, the electronic device may display the video card of the target video as well as the capturing control 60 and/or the sharing control 61 of the target video on the video play page, and may display the posting success prompt message of the target video as well as object information of each object the user wants to share with, for example, avatar and/or username, etc. (not illustrated in the figure) of each object the user wants to share with, as illustrated in FIG. 8.

Therefore, when the user wants to capture a new video, the user may trigger the capturing control 60 displayed in the video card of the target video. Correspondingly, when detecting a user triggering the capturing control 60 of the target video, the electronic device may switch the current page from the video play page to the capturing page for the user to capture a new video.

When the user wants to share the target video, the user may select object information of a corresponding object the user wants to share with that is displayed in the video card of the target video, and trigger the sharing control 61 displayed in the video card of the target video. Correspondingly, when detecting a user triggering the sharing control 61 of the target video, the electronic device may share the target video with the object the user wants to share with corresponding to the object information selected by the user.

In this embodiment, whether the user is viewing the target video may not be considered. When the target video posting has succeeded, the preset interactive control is directly displayed, or, the preset interactive control is displayed after the view operation for the video card of the target video is received. When the target video posting has succeeded, if the currently played video is the target video, that is, if the user is viewing the target video, the preset interactive control may be directly displayed, for example, the preset interactive control is displayed in the posting success prompt window 62, as illustrated in FIG. 6; or the video play region is zoomed out and the preset interactive control is displayed outside the video play region, as illustrated in FIG. 7; if the currently played video is not the target video, that is, if the user is viewing a video other than the target video, the video card of the target video and the preset interactive control may be displayed after the view operation for the video card of the target video is received, as illustrated in FIG. 8, and therefore, this may not only timely remind the user that the target video posting has succeeded, but also avoid excessively interrupting the user viewing the video, so as to improve user experience.

S208: in response to the failure in posting the target video, stopping displaying the posting identifier, and displaying a retry control.

In this embodiment, when the target video posting has failed, a retry control may be displayed to facilitate the user to repost the target video, so as to simplify the operation required for the user to repost the video and improve user experience.

When the target video posting has failed, displaying of the posting identifier of the target video may be stopped, and the retry control may be displayed in an upper layer of a video picture displayed on the video play page; or, a posting failure prompt window may be popped up and the retry control may be displayed in the posting failure prompt window.

Figure 9:
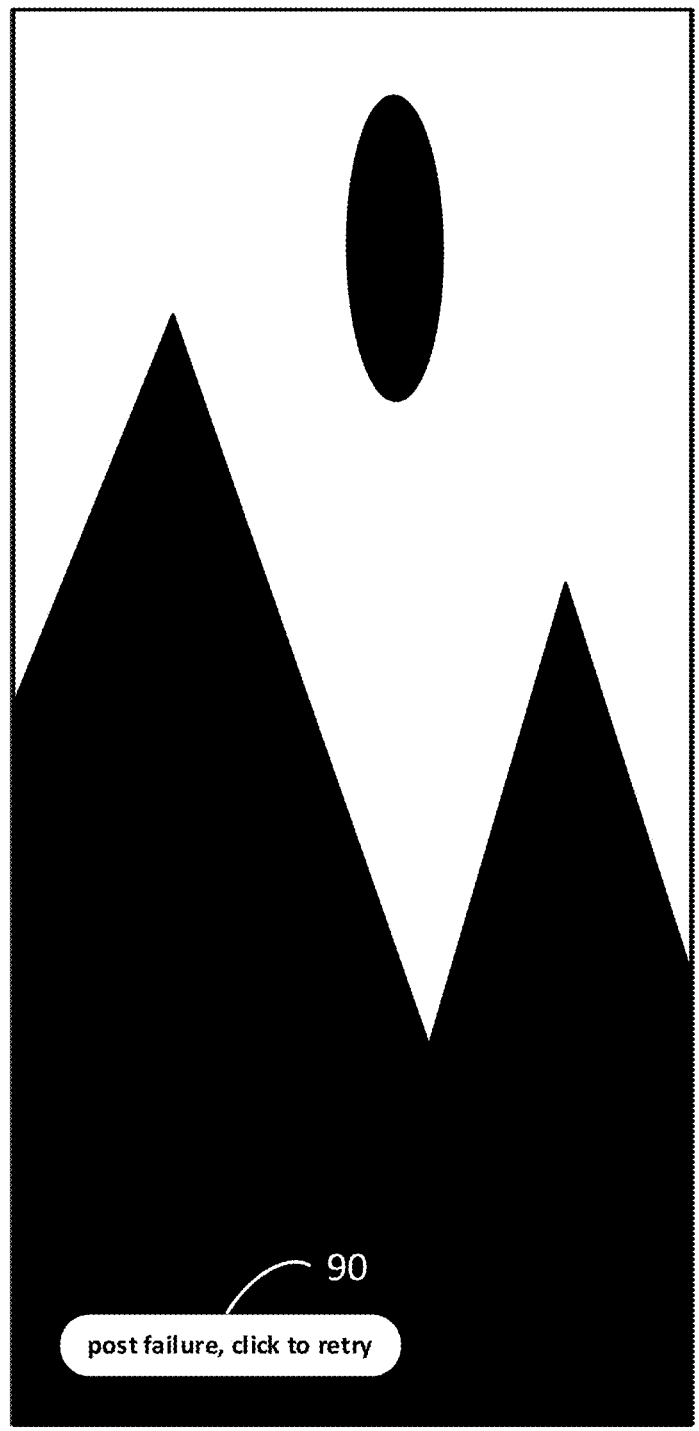
FIG. 9 is a schematic diagram of displaying a retry control provided by an embodiment of the present disclosure.
Figure 10:
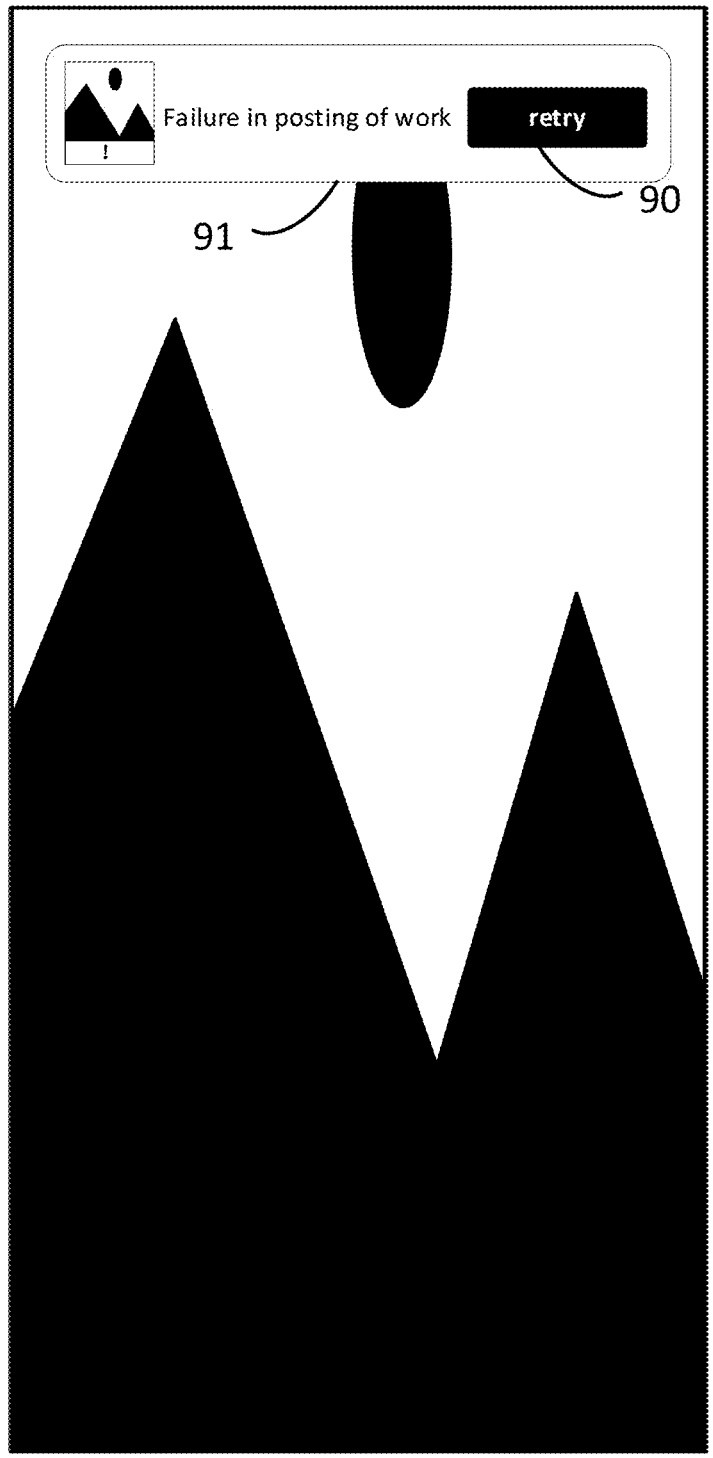
FIG. 10 is a schematic diagram of a "posting failed" prompt window provided by an embodiment of the present disclosure.

For example, as illustrated in FIG. 9, when the currently played video is the target video, displaying of the posting identifier of the target video may be stopped, a retry control 90 may be displayed in the upper layer of the video picture displayed on the video play page, and a posting failure prompt message (not illustrated) may be displayed on the video play page; as illustrated in FIG. 10, when the currently played video is not the target video, displaying of the posting identifier of the target video may be stopped, a posting failure prompt window 91 may be displayed, the retry control 90 may be displayed in the posting failure prompt window 91, and a posting failure prompt message may be displayed in the posting failure prompt window 91.

S209: in response to the trigger operation for the retry control, reposting the target video, and redisplaying the posting identifier of the target video.

When the user wants to repost the target video, the user may trigger the retry control of the target video. Correspondingly, when detecting a user triggering the retry control for the target video, the electronic device may repost the target video, and display the posting identifier of the target video.

In addition, since the user already previews the target video when posting the target video for the first time, the user may continue to play the currently played video and continue to switch the video according to the current video stream when reposting the target video, without automatically adding the target video into the current video stream or automatically playing the target video. Therefore, it avoids interrupting the user viewing the video and improves user experience.

In this embodiment, if the user does not trigger the retry control for a long time after the retry control of the target video is displayed, for example, if the user does not trigger the retry control within a preset time period, it may be determined that the user does not want to repost the target video; at this time, displaying of the retry control may be stopped, and the target video may be deleted or the target video may be stored into a draft box of the user. In this case, after displaying the retry control, the method further includes: in response to not receiving the trigger operation for the retry control within a preset time period, stopping displaying the retry control, and deleting the target video or storing the target video into a draft box. For example, it may be determined whether to automatically store the target video into the draft box of the user according to whether the draft box is empty; for example, when the draft box of the user is empty, that is, when no works are stored in the draft box of the user, the target video may be deleted; and when the draft box of the user is not empty, the target video may be stored into the draft box.

In the video posting method provided by this embodiment, by displaying the capturing control 60 and/or the sharing control in response to the video posting being successful, and displaying the retry control in response to failure in posting the video, it can provide convenience for the user to capture new videos, share videos and/or repost videos, so as to improve user experience.

Figure 11:
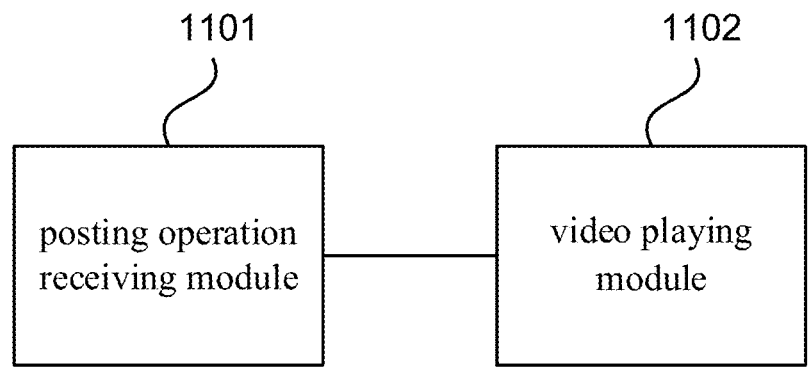
FIG. 11 is a structural block diagram of a video posting apparatus provided by an embodiment of the present disclosure.

FIG. 11 is a structural block diagram of a video posting apparatus provided by an embodiment of the present disclosure. The apparatus may be implemented by software and/or hardware, and may be configured in the electronic device, for example, may be configured in a mobile phone or a tablet personal computer, and may implement previewing the video being posted by executing the video posting method. As illustrated in FIG. 11, the video posting apparatus provided by this embodiment may include: a posting operation receiving module 1101 and a video playing module 1102.

The posting operation receiving module 1101 is configured to receive a posting operation for a target video. The video playing module 1102 is configured to: in response to the posting operation, play the target video, and display a posting identifier of the target video. The posting identifier is used for indicating that posting of the target video is not completed yet.

In the video posting apparatus provided by this embodiment, the posting operation receiving module receives the posting operation for the target video; the video playing module, in response to the posting operation, plays the target video, and displays the posting identifier of the target video in the first display style. The posting identifier is used for indicating posting progress of the target video. In this embodiment, by adopting the above-described technical solution, the video is played during the video posting process, so that the user can preview the video being posted during the video posting process without waiting for finishing video posting, which allows the user to discover problems in the video timely, reduces waiting time for the user, and improves user experience.

In one embodiment, the video posting apparatus may further include: a video switching module, which is configured to, after displaying the posting identifier of the target video in the first style, in response to the video switch operation, switch the target video to a next video, and switch the display style of the posting identifier from the first display style to the second display style.

In one embodiment, the video posting apparatus may further include: a personal homepage display module, which is configured to, after displaying the posting identifier of the target video in the first display style, in response to a personal homepage display operation, display the personal homepage of the user, and display video information of the target video and the posting identifier of the target video on the personal homepage. The posting identifier is displayed in a third display style on the personal homepage.

In one embodiment, the video posting apparatus may further include: a control display module, which is configured to, in response to posting of the target video being successful, stop displaying the posting identifier, and display a preset interactive control.

In the above-described implementations, the control display module may be configured to: zoom out a video play region of a current page, and display the preset interactive control outside the video play region that is zoomed out.

In one embodiment, the video posting apparatus may further include: a card acquiring module, which is configured to, when posting of the target video is successful, stop displaying the posting identifier, and acquire a video card of the target video; and a card display module, which is configured to display the video card and the preset interactive control in response to a display operation for the video card.

In one embodiment, the video posting apparatus may further include: a retry control display module, which is configured to, when posting of the target video failed, stop displaying the posting identifier, and display a retry control; and a reposting module, which is configured to repost the target video in response to a trigger operation for the retry control, and redisplay the posting identifier of the target video.

In one embodiment, the video posting apparatus may further include: a stopping display module, which is configured to, in response to not receiving the trigger operation for the retry control within a preset time period after displaying the retry control, stop displaying the retry control, and deleting the target video or storing the target video into a draft box.

The video posting apparatus provided by the embodiments of the present disclosure can execute the video posting method provided by any one embodiment of the present disclosure, and has corresponding functional modules and effects for executing the video posting method. The video posting method provided by any one embodiment of the present disclosure may be referred to for technical details not described in this embodiment.

Hereinafter, referring to FIG. 12, it illustrates a schematic structural diagram of an electronic device (e.g., a terminal device) 1200 suitable for implementing the embodiments of the present disclosure. The terminal device in the embodiments of the present disclosure may include but not limited to a mobile terminal such as a mobile phone, a laptop, a digital broadcast receiver, a personal digital assistant (PDA), a portable android device (PAD), a portable multimedia player (PMP), a vehicle-mounted terminal (e.g., a vehicle-mounted navigation terminal), etc., and a stationary terminal such as a digital television (TV), a desktop computer, etc. The electronic device 1200 illustrated in FIG. 12 is only an example and should not impose any limitation on function and scope of use of the embodiments of the present disclosure.

Figure 12:
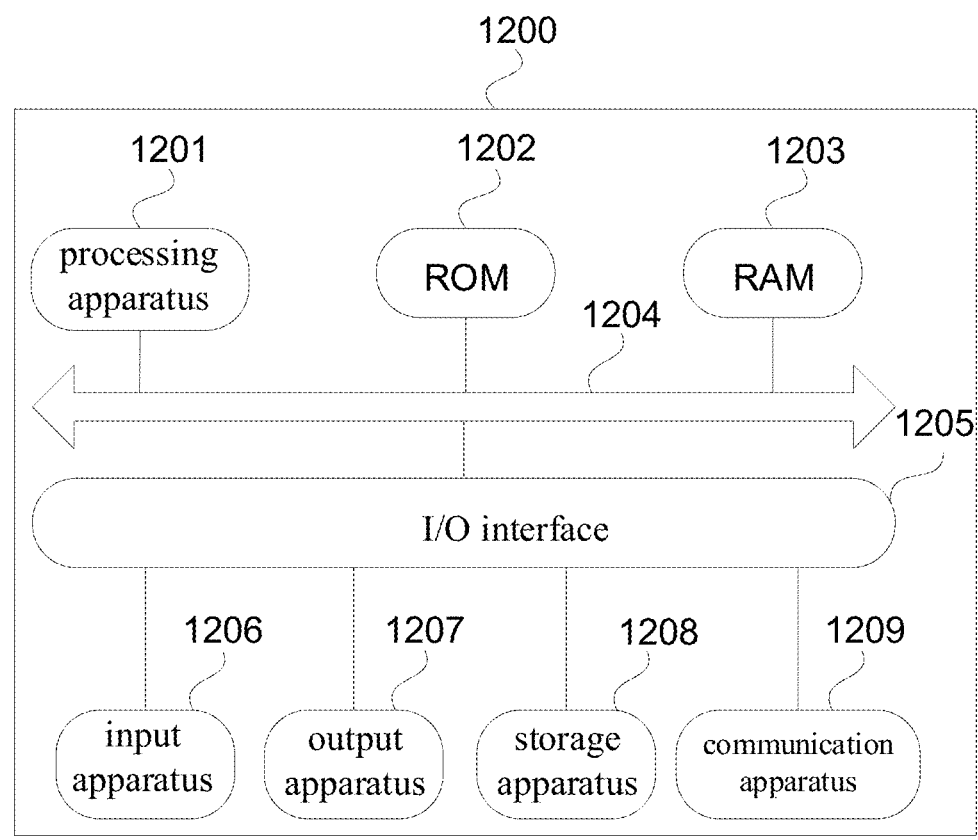
FIG. 12 is a schematic structural diagram of an electronic device provided by an embodiment of the present disclosure.

As illustrated in FIG. 12, the electronic device 1200 may include a processing apparatus (e.g., a central processing unit, a graphics processing unit, etc.) 1201, which may execute various appropriate actions and processing according to a program stored in a read-only memory (ROM) 1202 or a program loaded from a storage apparatus 1208 into a random access memory (RAM) 1203. The RAM 1203 further stores various programs and data required for operation of the electronic device 1200. The processing apparatus 1201, the ROM 1202, and the RAM 1203 are connected with each other through a bus 1204. An input/output (I/O) interface 1205 is also coupled to the bus 1204.

Usually, apparatuses below may be coupled to the I/O interface 1205: input apparatuses 1206 including, for example, a touch screen, a touch pad, a keyboard, a mouse, a camera, a microphone, an accelerometer, a gyroscope, etc.; output apparatuses 1207 including, for example, a liquid crystal display (LCD), a speaker, a vibrator, etc.; storage apparatuses 1208 including, for example, a magnetic tape, a hard disk, etc.; and a communication apparatus 1209. The communication apparatus 1209 may allow the electronic device 1200 to perform wireless or wired communication with other device to exchange data. Although FIG. 12 illustrates the electronic device 1200 including various apparatuses, it should be understood that it is not required to implement or have all the apparatuses illustrated, and the electronic device 1200 may alternatively implement or have more or fewer apparatuses.

According to the embodiments of the present disclosure, the process described above with reference to the flow chart may be implemented as computer software programs. For example, the embodiments of the present disclosure provide a computer program product, which includes a computer program carried on a non-transitory computer readable medium, and the computer program includes program codes for executing the method illustrated in the flow chart. In such embodiments, the computer program may be downloaded and installed from the network via the communication apparatus 1209, or installed from the storage apparatus 1208, or installed from the ROM 1202. When executed by the processing apparatus 1201, the computer program may execute the above-described functions defined in the method provided by the embodiments of the present disclosure.

The above-mentioned computer-readable medium in the present disclosure may be a computer-readable signal medium or a computer-readable storage medium or any combination thereof. For example, the computer-readable storage medium may be, but not limited to, an electric, magnetic, optical, electromagnetic, infrared, or semiconductor system, apparatus or device, or any combination thereof. Examples of the computer-readable storage medium may include but not be limited to: an electrical connection with one or more wires, a portable computer disk, a hard disk, a random-access memory (RAM), a read-only memory (ROM), an erasable programmable read-only memory (EPROM or flash memory), an optical fiber, a compact disk read-only memory (CD-ROM), an optical storage device, a magnetic storage device, or any appropriate combination of them. In the present disclosure, the computer-readable storage medium may be any tangible medium containing or storing a program that can be used by or in combination with an instruction execution system, apparatus or device. In the present disclosure, the computer-readable signal medium may include a data signal that propagates in a baseband or as a part of a carrier and carries computer-readable program codes. The data signal propagating in such a manner may take a plurality of forms, including but not limited to an electromagnetic signal, an optical signal, or any appropriate combination thereof. The computer-readable signal medium may also be any other computer-readable medium than the computer-readable storage medium. The computer-readable signal medium may send, propagate or transmit a program used by or in combination with an instruction execution system, apparatus or device. The program code contained on the computer-readable medium may be transmitted by using any suitable medium, including but not limited to an electric wire, a fiber-optic cable, radio frequency (RF) and the like, or any appropriate combination of them.

In some implementation modes, the client and the server may communicate with any network protocol currently known or to be researched and developed in the future such as hypertext transfer protocol (HTTP), and may communicate (via a communication network) and interconnect with digital data in any form or medium. Examples of communication networks include a local area network (LAN), a wide area network (WAN), the Internet, and an end-to-end network (e.g., an ad hoc end-to-end network), as well as any network currently known or to be researched and developed in the future.

The above-mentioned computer-readable medium may be included in the above-mentioned electronic device, or may also exist alone without being assembled into the electronic device.

The above-mentioned computer-readable medium carries one or more programs, and when the one or more programs are executed by the electronic device, the electronic device is caused to: receive a posting operation for a target video; and in response to the posting operation, play the target video, and display a posting identifier of the target video in a first display style, wherein the posting identifier is used for indicating posting progress of the target video.

The computer program codes for performing the operations of the present disclosure may be written in one or more programming languages or a combination thereof. The above-mentioned programming languages include but are not limited to object-oriented programming languages such as Java, Smalltalk, C++, and also include conventional procedural programming languages such as the "C" programming language or similar programming languages. The program code may be executed entirely on the user's computer, partly on the user's computer, as a stand-alone software package, partly on the user's computer and partly on a remote computer, or entirely on the remote computer or server. In the scenario related to the remote computer, the remote computer may be connected to the user's computer through any type of network, including a local area network (LAN) or a wide area network (WAN), or the connection may be made to an external computer (for example, through the Internet using an Internet service provider).

The flowcharts and block diagrams in the accompanying drawings illustrate the architecture, functionality, and operation of possible implementations of systems, methods, and computer program products according to various embodiments of the present disclosure. In this regard, each block in the flowcharts or block diagrams may represent a module, a program segment, or a portion of codes, including one or more executable instructions for implementing specified logical functions. It should also be noted that, in some alternative implementations, the functions noted in the blocks may also occur out of the order noted in the accompanying drawings. For example, two blocks shown in succession may, in fact, can be executed substantially concurrently, or the two blocks may sometimes be executed in a reverse order, depending upon the functionality involved. It should also be noted that, each block of the block diagrams and/or flowcharts, and combinations of blocks in the block diagrams and/or flowcharts, may be implemented by a dedicated hardware-based system that performs the specified functions or operations, or may also be implemented by a combination of dedicated hardware and computer instructions.

The modules or units involved in the embodiments of the present disclosure may be implemented in software or hardware. Among them, the name of the module or unit does not constitute a limitation of the unit itself under certain circumstances.

The functions described herein above may be performed, at least partially, by one or more hardware logic components. For example, without limitation, available exemplary types of hardware logic components include: a field programmable gate array (FPGA), an application specific integrated circuit (ASIC), an application specific standard product (ASSP), a system on chip (SOC), a complex programmable logical device (CPLD), etc.

In the context of the present disclosure, the machine-readable medium may be a tangible medium that may include or store a program for use by or in combination with an instruction execution system, apparatus or device. The machine-readable medium may be a machine-readable signal medium or a machine-readable storage medium. The machine-readable medium includes, but is not limited to, an electrical, magnetic, optical, electromagnetic, infrared, or semi-conductive system, apparatus or device, or any suitable combination of the foregoing. Examples of machine-readable storage medium include electrical connection with one or more wires, portable computer disk, hard disk, random-access memory (RAM), read-only memory (ROM), erasable programmable read-only memory (EPROM or flash memory), optical fiber, portable compact disk read-only memory (CD-ROM), optical storage device, magnetic storage device, or any suitable combination of the foregoing.

According to one or more embodiments of the present disclosure, example 1 provides a video posting method, which comprises:

receiving a posting operation for a target video; and in response to the posting operation, playing the target video, and displaying a posting identifier of the target video in a first display style, wherein the posting identifier is used for indicating posting progress of the target video.

According to one or more embodiments of the present disclosure, in the method of example 2 according to example 1, after displaying the posting identifier of the target video in the first display style, the method further comprises:

in response to a video switch operation, switching the target video to a next video, and switching a display style of the posting identifier from the first display style to a second display style.

According to one or more embodiments of the present disclosure, in the method of example 3 according to example 1, after displaying the posting identifier of the target video in the first display style, the method further comprises:

in response to a personal homepage display operation, displaying a personal homepage of a user, and displaying video information of the target video and the posting identifier of the target video on the personal homepage, wherein the posting identifier is displayed on the personal homepage in a third display style.

According to one or more embodiments of the present disclosure, the method of example 4 according to any one of examples 1 to 3 further comprises:

in response to posting of the target video being successful, stopping displaying the posting identifier, and displaying a preset interactive control.

According to one or more embodiments of the present disclosure, in the method of example 5 according to example 4, displaying the preset interactive control comprises:
zooming out a video play region of a current page, and displaying the preset interactive control outside the video play region that is zoomed out.

According to one or more embodiments of the present disclosure, the method of example 6 according to any one of examples 1 to 3 further comprises:
in response to posting of the target video being successful, stopping displaying the posting identifier, and acquiring a video card of the target video; and
displaying the video card and a preset interactive control in response to a display operation for the video card.

According to one or more embodiments of the present disclosure, the method of example 7 according to any one of examples 1 to 3 further comprises:
in response to failure in posting the target video, stopping displaying the posting identifier, and displaying a retry control; and
in response to a trigger operation for the retry control, reposting the target video, and redisplaying the posting identifier of the target video.

According to one or more embodiments of the present disclosure, in the method of example 8 according to example 7, after displaying the retry control, the method further comprises:
in response to not receiving the trigger operation for the retry control within a preset time period, stopping displaying the retry control, and deleting the target video or storing the target video into a draft box.

According to one or more embodiments of the present disclosure, example 9 provides a video posting apparatus, which comprises:
a posting operation receiving module, configured to receive a posting operation for a target video; and
a video playing module, configured to: in response to the posting operation, play the target video, and display a posting identifier of the target video in a first display style, wherein the posting identifier is used for indicating posting progress of the target video.

According to one or more embodiments of the present disclosure, example 10 provides an electronic device, which comprises:
at least one processor; and
a memory, configured to store at least one program,
wherein the at least one program, when executed by the at least one processor, causes the at least one processor to implement the video posting method according to any one of examples 1 to 8.

According to one or more embodiments of the present disclosure, example 11 provides a computer-readable storage medium, wherein a computer program is stored on the computer-readable storage medium, the program, when executed by a processor, implements the video posting method according to any one of examples 1 to 8.

According to one or more embodiments of the present disclosure, example 12 provides a computer program product, wherein the computer program product, when executed by a computer, causes the computer to implement the video posting method according to any one of examples 1 to 8.

In addition, although multiple operations are described in a specific order, this should not be understood as requiring them to be executed in the illustrated specific order or in sequential order. In certain environments, multitasking and parallel processing may be advantageous. Similarly, although multiple implementation details are included in the above discussion, they should not be interpreted as limiting the scope of this disclosure. Some features described in the context of individual embodiment can also be combined to be implemented in a single embodiment. On the contrary, multiple features described in the context of a single embodiment can also be implemented separately or in any suitable sub-combination in multiple embodiments.

The invention claimed is:

1. A video posting method, comprising:
receiving a posting operation for a target video from a user;
in response to the posting operation, playing the target video on a video play page during a process of posting the target video, and displaying a posting identifier of the target video in a first display style, the posting identifier indicating a posting progress of the target video;
receiving a page switch operation;
switching to a profile page of the user from the video play page in response to receiving the page switch operation;
displaying the profile page of the user, wherein the profile page of the user comprises one or more covers of one or more videos posted by the user in a predetermined order, and the one or more covers comprise a cover of the target video; and
displaying the posting identifier of the target video in a display region on the profile page.

2. The method according to claim 1, wherein, after displaying the posting identifier of the target video in the first display style, the method further comprises:
receiving a video switch operation;
in response to the video switch operation, switching the target video to a next video, and switching a display style of the posting identifier from the first display style to a second display style.

3. The method according to claim 1, wherein the posting identifier is displayed on the profile page in a third display style.

4. The method according to claim 1, further comprising:
determining whether posting of the target video is successful;
in response to the posting of the target video being successful, stopping displaying the posting identifier, and displaying a preset interactive control.

5. The method according to claim 4, wherein displaying the preset interactive control comprises:
zooming out a video play region of a current page, and displaying the preset interactive control outside the video play region that is zoomed out.

6. The method according to claim 1, further comprising:
determining whether posting of the target video is successful;
in response to the posting of the target video being successful, stopping displaying the posting identifier, and acquiring a video card of the target video; and
displaying the video card and a preset interactive control in response to a display operation for the video card.

7. The method according to claim 1, further comprising:
determining whether posting of the target video is successful;
in response to a failure in the posting of the target video, stopping displaying the posting identifier, and displaying a retry control; and
in response to a trigger operation for the retry control, reposting the target video, and redisplaying the posting identifier of the target video.

8. The method according to claim 7, wherein, after displaying the retry control, the method further comprises:
determining whether the trigger operation for the retry control is received within a preset time period; and
in response to determining that the trigger operation for the retry control is not received within the preset time period, stopping displaying the retry control, and deleting the target video or storing the target video into a draft box.

9. An electronic device, comprising:
at least one processor; and
a memory, configured to store at least one program,
wherein the at least one program, when executed by the at least one processor, causes the at least one processor to implement acts, wherein the acts comprise:
receiving a posting operation for a target video from a user;
in response to the posting operation, playing the target video on a video play page during a process of posting the target video, and displaying a posting identifier of the target video in a first display style, the posting identifier indicating a posting progress of the target video;
receiving a page switch operation;
switching to a profile page of the user from the video play page in response to receiving the page switch operation;
displaying the profile page of the user, wherein the profile page of the user comprises one or more covers of one or more videos posted by the user in a predetermined order, and the one or more covers comprise a cover of the target video; and
displaying the posting identifier of the target video in a display region on the profile page.

10. The electronic device according to claim 9, wherein, after displaying the posting identifier of the target video in the first display style, the acts further comprise:
receiving a video switch operation;
in response to the video switch operation, switching the target video to a next video, and switching a display style of the posting identifier from the first display style to a second display style.

11. The electronic device according to claim 9 wherein the posting identifier is displayed on the profile page in a third display style.

12. The electronic device according to claim 9, wherein the acts further comprise:
determining whether posting of the target video is successful;
in response to the posting of the target video being successful, stopping displaying the posting identifier, and displaying a preset interactive control.

13. The electronic device according to claim 12, wherein displaying the preset interactive control comprises:
zooming out a video play region of a current page, and displaying the present interactive control outside the video play region that is zoomed out.

14. The electronic device according to claim 9, wherein the acts further comprise:
determining whether posting of the target video is successful;
in response to the posting of the target video being successful, stopping displaying the posting identifier, and acquiring a video card of the target video; and
displaying the video card and a preset interactive control in response to a display operation for the video card.

15. The electronic device according to claim 9, wherein the acts further comprise:
determining whether posting of the target video is successful;
in response to a failure in the posting of the target video, stopping displaying the posting identifier, and displaying a retry control; and
in response to a trigger operation for the retry control, reposting the target video, and redisplaying the posting identifier of the target video.

16. The electronic device according to claim 15, wherein, after displaying the retry control, the acts further comprise:
determining whether the trigger operation for the retry control is received within a preset time period; and
in response to determining that the trigger operation for the retry control is not received within the preset time period, stopping displaying the retry control, and deleting the target video or storing the target video into a draft box.

17. A non-transitory computer-readable storage medium, wherein a computer program is stored on the non-transitory computer-readable storage medium, the program, when executed by a processor, causes the processor to implement operations comprising:
receiving a posting operation for a target video from a user;
in response to the posting operation, playing the target video on a video play page during a process of posting the target video, and displaying a posting identifier of the target video in a first display style, the posting identifier indicating a posting progress of the target video;
receiving a page switch operation;
switching to a profile page of the user from the video play page in response to receiving the page switch operation;
displaying the profile page of the user, wherein the profile page of the user comprises one or more covers of one or more videos posted by the user in a predetermined order, and the one or more covers comprise a cover of the target video; and
displaying the posting identifier of the target video in a display region on the profile page.

18. The non-transitory computer-readable storage medium according to claim 17, wherein, after displaying the posting identifier of the target video in the first display style, the operations further comprise:
receiving a video switch operation;
in response to the video switch operation, switching the target video to a next video, and switching a display style of the posting identifier from the first display style to a second display style.

19. The non-transitory computer-readable storage medium according to claim 17, wherein the posting identifier is displayed on the profile page in a third display style.

* * * * *